Oct. 5, 1948.  S. E. BOUCHARD  2,450,711
SEMIRIMLESS SPECTACLE MOUNTING
Filed June 4, 1945

SAMUEL E. BOUCHARD
INVENTOR

BY *G. A. Ellestad*
ATTORNEY

Patented Oct. 5, 1948

2,450,711

UNITED STATES PATENT OFFICE 2,450,711

SEMIRIMLESS SPECTACLE MOUNTING

Samuel E. Bouchard, Brighton, N. Y., assignor to Bausch & Lomb Optical Company, Rochester, N. Y., a corporation of New York Application June 4, 1945, Serial No. 597,422

3 Claims. (Cl. 88—41)

This invention relates to ophthalmic mountings and more particularly it has reference to ophthalmic mountings of the so-called semi-rimless type.

One of the objects of my invention is to provide a semi-rimless ophthalmic mounting which will be neat in appearance, relatively simple in structure, and efficient in operation. Another object is to provide such a type of mounting which is formed substantially of non-metallic material. A still further object is to provide a semi-rimless mounting, formed of non-metallic and metallic materials, and embodying improved means for holding the lenses. A further object is to provide a semi-rimless mounting in which the lenses are held by the resilience of metallic mounting means secured in a non-metallic frame.

These and other objects and advantages reside in certain novel features of construction, arrangement, and combination of parts as will hereinafter be more fully described and pointed out in the appended claims.

Referring to the drawings.

Figure 1:
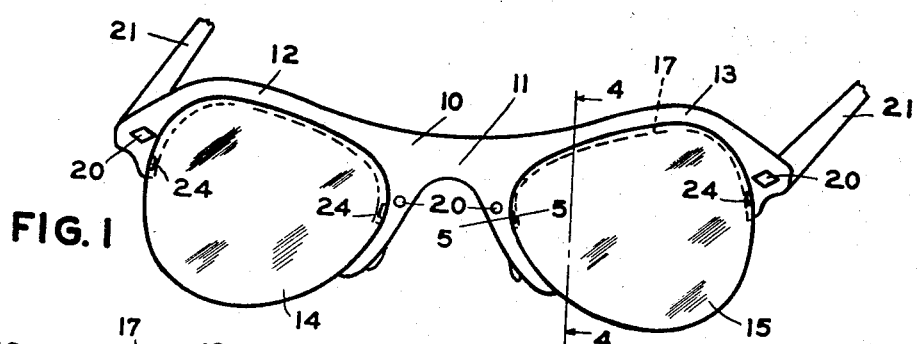
Fig. 1 is a front view of an ophthalmic mounting embodying my invention.
Figure 2:
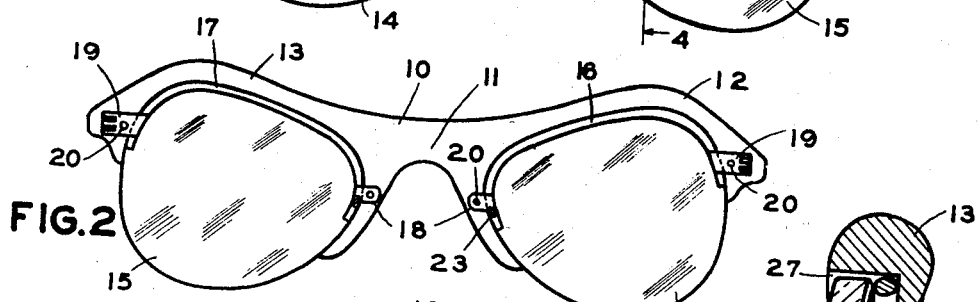
Fig. 2 is a rear view thereof with the temples and nose pads removed.
Figure 3:
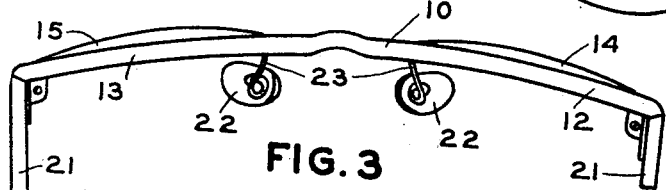
Fig. 3 is a top plan view of the mounting.

A preferred embodiment of my invention is illustrated in the drawings wherein 10 indicates a non-metallic frame member having a bridge portion 11 connecting the semi-rimless portions 12 and 13 which extend along the tops and nasal and temporal sides of the lenses 14 and 15. Mounted within the semi-rimless portions 12 and 13 are the resilient, metallic mounting members 16 and 17. Plates 18 are secured to the nasal sides of the mounting members 16 and 17 by any suitable means such as soldering, for example. Similarly, plates 19 are secured to the temporal sides of the mounting members 16 and 17. The plates 18 and 19, mounted on the rear face of frame 10, are secured to the frame 10 by any suitable means such as rivets 20. Temples 21 are pivotally mounted on the plates 19 and nose pads 22 are attached by means of pad arms 23 which are soldered to the plates 18.

Secured to the nasal and temporal portions of the mounting members 16 and 17 and projecting forwardly therefrom are the lens straps 24 which engage notches 25 formed in the nasal and temporal edges of the lenses 14 and 15. The forward ends of the straps 24 are bent over, as shown at 26, so as to engage the front faces of the lenses 14 and 15 and hold the rear faces of the lenses against the metallic mounting members 16 and 17. The resilience of the metallic mounting members 16 and 17 serves to keep the straps 24 positioned in firm engagement with the notches 25. When it is desired to remove a lens, the nasal and temporal portions of a mounting member are forced apart, together with the adjacent portions of the non-metallic frame 10, so as to free the straps 24 from engagement with the notches 25. It will also be apparent that a lens may be inserted in the mounting by spreading the nasal and temporal straps apart so as to permit them to engage the notches in the nasal and temporal edges of the lens. By this construction, it will be apparent that the lenses may be readily inserted or removed from the mounting without the necessity of drilling holes in the lenses and using screws or other fastening devices which pass through such holes.

Figure 6:
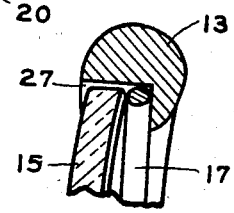
Fig. 6 is a fragmentary sectional view showing a modification of the arrangement of the metallic and non-metallic parts.

Instead of forming the semi-rim non-metallic portions 12 and 13 with a continuous internal surface extending along the inner and upper portion of the lenses, I may provide in the front surface of the semi-rim portions 12 and 13 a recess which is shown at 27 in Fig. 6. In this construction, the metallic mounting member 17 is positioned against the face of the recess and the lens 15 is held against the mounting member 17 by means of the lens straps 24. It will be apparent, therefore, that with this structure the metallic mounting members will not be visible from the rear side of the mounting but will only be slightly visible through the peripheral portions of the lenses. This structure also tends to hold the mounting members 16 and 17 more firmly in place.

Figure 7:
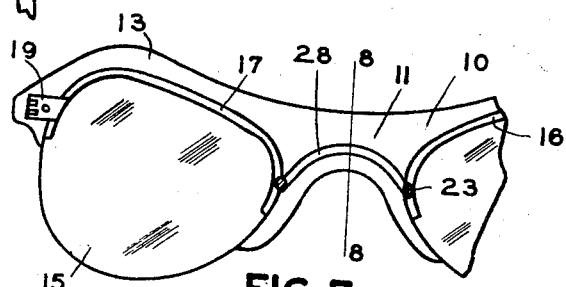
Fig. 7 is a partial rear view of a modification.
Figure 4:
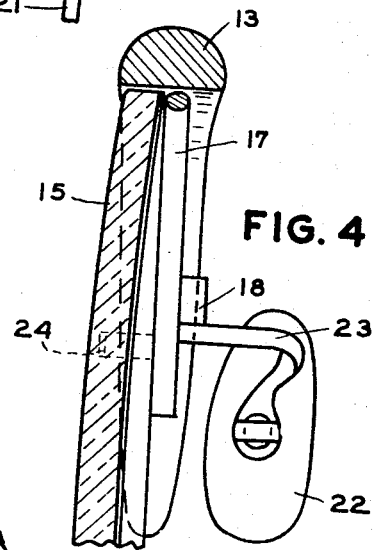
Fig. 4 is an enlarged sectional view taken on line 4—4 of Fig. 1.
Figures 5, 8:
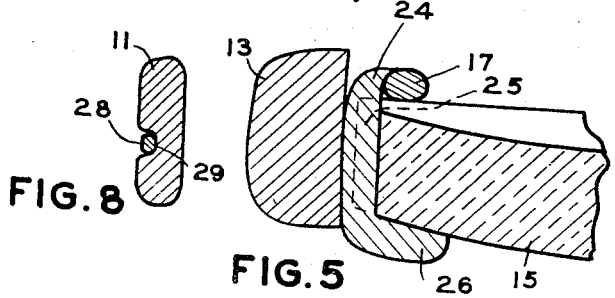
Fig. 5 is a sectional view taken on line 5—5 of Fig. 1.
Fig. 8 is a sectional view taken on line 8—8 of Fig. 7.

A further modification is illustrated in Fig. 7 wherein the metallic mounting members 16 and 17 are connected by a metallic bridge 28 which is positioned in a groove 29 formed in the bridge portion 11 of the non-metallic frame 10.

From the foregoing, it will be apparent that I am able to attain the objects of my invention and provide an improved ophthalmic mounting of the semi-rimless type which is formed substantially of non-metallic material. The lenses

I claim:

1. A semi-rimless ophthalmic mounting comprising a pair of spaced lenses, resilient metallic mounting means extending along the upper edges of the lenses, said mounting means having nasal and temporal portions extending along the sides of the lenses, means for holding the lenses on the mounting means comprising lens engaging means secured to said portions and engaging notches formed in the temporal and nasal edges of the lenses, the resilience of the mounting of the lenses serving to hold the lens engaging means in engagement with the lenses, a non-metallic frame having portions extending along said mounting means and overlying the mounting means and the edges of the lenses, a bridge connecting said portions, said frame portions being slightly resilient and wider than the combined thicknesses of the lenses and the metallic mounting means, and retaining means for securing the mounting means to said frame, said retaining means comprising plates secured, respectively, to the temporal and nasal portions of the mounting means and retaining elements fastening said plates to portions of said frame.

2. An ophthalmic mounting comprising a pair of spaced lenses, a non-metallic frame having semi-rim portions extending along the top and sides of the lenses, a bridge portion connecting said semi-rim portions, each of said semi-rim portions having on its front side a recess which extends partially around the lens, a resilient mounting member positioned within said recess and rearwardly of the lens, straps extending forwardly from the nasal and temporal sides of each mounting member, said straps engaging notches formed in the nasal and temporal edges of the lenses, said straps being held in said notches by the resilience of the mounting members, plates secured to the nasal and temporal portions of the mounting members, retaining means for securing the plates to the frame, and temples pivotally mounted on the plates secured to the temporal portions of the members.

3. An ophthalmic mounting comprising an integral non-metallic frame having two spaced semi-rim portions connected by a bridge, a pair of lenses mounted within the semi-rim portions, means for detachably securing the lenses to the frame, said means comprising a resilient mounting member extending along the nasal, upper and temporal edges of each lens and positioned rearwardly thereof, each member being secured to the respectively adjacent semi-rim portion of the frame, the semi-rim portions being slightly resilient and overlying the members and the nasal, upper and temporal peripheral edges of the lenses, said portions being wider than the combined thicknesses of the members and the lenses whereby the members and the upper, nasal and temporal edges of the lenses are concealed when viewed from above, and straps extending forwardly from the nasal and temporal portions of the members, said straps engaging in notches formed on the nasal and temporal edges of the lenses, said straps being held in the notches by the resilience of the members whereby the lenses are detachably secured to the frame.

SAMUEL E. BOUCHARD.

REFERENCES CITED

The following references are of record in the file of this patent:

UNITED STATES PATENTS

| Number | Name | Date |
|---|---|---|
| 1,515,624 | Schumacher et al. | Nov. 18, 1924 |
| 1,825,503 | Carow | Sept. 29, 1931 |
| 2,108,667 | Harris | Feb. 15, 1938 |
| 2,257,812 | Pomeranz | Oct. 7, 1941 |
| 2,277,118 | Leavitt | Mar. 24, 1942 |
| 2,330,249 | Splaine | Sept. 28, 1943 |
| 2,352,729 | Metzger | July 4, 1944 |
| 2,357,267 | Rohrbach | Aug. 29, 1944 |
| 2,372,059 | Cook | Mar. 20, 1945 |
| 2,373,862 | Vine | Apr. 17, 1945 |
| 2,385,975 | Ellestad | Oct. 2, 1945 |

FOREIGN PATENTS

| Number | Country | Date |
|---|---|---|
| 794,129 | France | Dec. 2, 1935 |